United States Patent
Hanna et al.

(10) Patent No.: US 7,363,157 B1
(45) Date of Patent: Apr. 22, 2008

(54) METHOD AND APPARATUS FOR PERFORMING WIDE AREA TERRAIN MAPPING

(75) Inventors: Barbara Hanna, Princeton Junction, NJ (US); Bing-Bing Chai, Princeton Junction, NJ (US); Stephen Hsu, Sunnyvale, CA (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 11/352,434

(22) Filed: Feb. 10, 2006

Related U.S. Application Data

(60) Provisional application No. 60/651,685, filed on Feb. 10, 2005.

(51) Int. Cl.
*G06F 7/22* (2006.01)
(52) U.S. Cl. .......................................... 702/5
(58) Field of Classification Search ............ 702/5, 702/2
See application file for complete search history.

(56) References Cited

U.S. PATENT DOCUMENTS

| | | | |
|---|---|---|---|
| 5,963,664 A | 10/1999 | Kumar et al. | |
| 6,664,529 B2* | 12/2003 | Pack et al. | 250/208.1 |
| 6,757,445 B1* | 6/2004 | Knopp | 382/285 |
| 7,127,348 B2* | 10/2006 | Smitherman et al. | 701/208 |
| 7,187,809 B2* | 3/2007 | Zhao et al. | 382/285 |
| 7,190,496 B2* | 3/2007 | Klug et al. | 359/23 |
| 7,194,389 B2* | 3/2007 | Damron | 703/2 |
| 2005/0052714 A1* | 3/2005 | Klug et al. | 359/3 |
| 2005/0195096 A1* | 9/2005 | Ward et al. | 340/995.14 |

* cited by examiner

*Primary Examiner*—Donald E McElheny, Jr.
(74) *Attorney, Agent, or Firm*—Lowenstein Sandler PC

(57) ABSTRACT

A method and apparatus for performing wide area terrain mapping. The system comprises a digital elevation map (DEM) and mosaic generation engine that processes images that are simultaneously captured by an electro-optical camera (RGB camera) and a LIDAR sensor. The image data collected by both the camera and the LIDAR sensor are processed to create a geometrically accurate three-dimensional view of objects viewed from an aerial platform.

21 Claims, 6 Drawing Sheets

METHOD AND APPARATUS FOR PERFORMING WIDE AREA TERRAIN MAPPING

CROSS-REFERENCE TO RELATED APPLICATIONS

This application claims benefit of U.S. provisional patent application Ser. No. 60/651,685, filed Feb. 10, 2005, which is incorporated by reference.

GOVERNMENT RIGHTS IN THIS INVENTION

This invention was made with U.S. government support under contract number GS-10F-0197L-84658. The U.S. government has certain rights in this invention.

BACKGROUND OF THE INVENTION

1. Field of the Invention

Embodiments of the present invention generally relate to an imaging system and, more particularly, the present invention relates to wide area terrain mapping.

2. Description of the Related Art

The geographic system industry has begun to exploit scanning LIDAR (Light Detection and Ranging) techniques to directly collect three-dimensional topography. Typically, a single laser beam is moved over the ground using aircraft motion and scanning mirrors. Using a measure of the time of flight for each pulse of a laser, range from the laser to the ground (or objects thereon) is estimated. Range samples are transformed to three-dimensional points in ground coordinates using high accuracy, onboard GPS/INS data and scan angles (collectively, "metadata"). The points are then connected into a three-dimensional mesh surface or re-gridded to a uniformly sampled digital elevation map (DEM) for display to a user. However, commercial scanning LIDAR instruments are relatively expensive and bulky such that aerial imagery (video imagery) must be acquired separately and then "draped" over the three-dimensional terrain that has been produced by the LIDAR technique. Such a process is costly, labor intensive, and time consuming.

Therefore, there is a need in the art for a comprehensive wide area terrain mapping system that combines both LIDAR information and electro-optic information, e.g., video images, in a single platform.

SUMMARY OF THE INVENTION

The present invention is a method and apparatus for performing wide area terrain mapping. The system comprises a digital elevation map (DEM) and mosaic generation engine that processes images that are simultaneously captured by an electro-optical camera (RGB camera) and a LIDAR sensor. The LIDAR sensor and camera are generally mounted on a scanner within an aerial platform. The image data collected by both the camera and the LIDAR sensor are processed to create a geometrically accurate three-dimensional view of objects viewed from the aerial platform.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention is a method and apparatus for performing wide area terrain mapping using a combination of LIDAR and video technology within a single platform.

Figure 1:
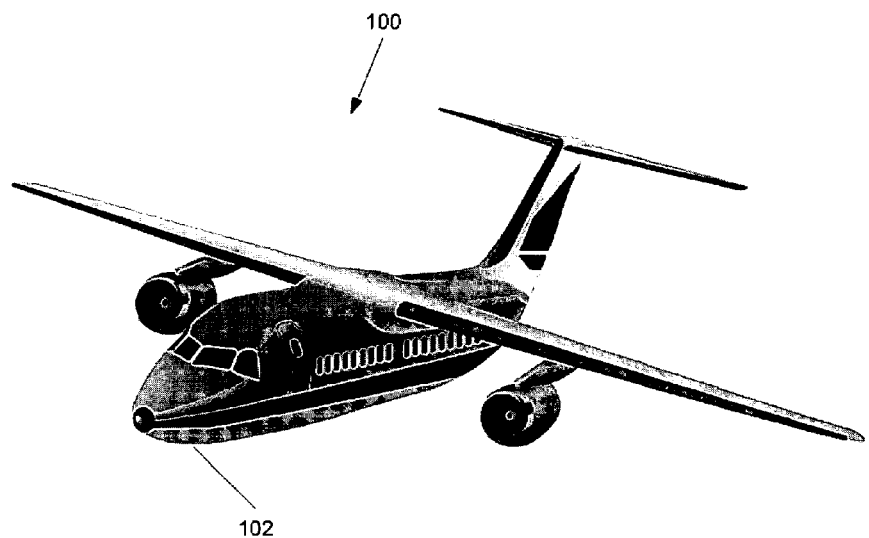
FIG. 1 depicts one embodiment of an aerial platform for carrying a sensor suite in accordance with the invention.

FIG. 1 depicts an aerial platform 100 that carries a sensor suite 102 that performs aerial imaging of objects on the ground. The platform 100 may be a manned airplane or helicopter, or the platform 100 may be an unmanned aerial vehicle (UAV). Whatever form the platform takes, the suite 100 is used to collect range data, video imagery, and metadata comprising the location of the platform (e.g., Universal Transverse Mercator (UTM) coordinates) and the orientation of the sensor suite 102 (e.g., a scan angle). This information is stored within the sensor suite 102 for subsequent processing. Of course, the information could also be transmitted to a ground station (not shown) for processing.

Figure 2:
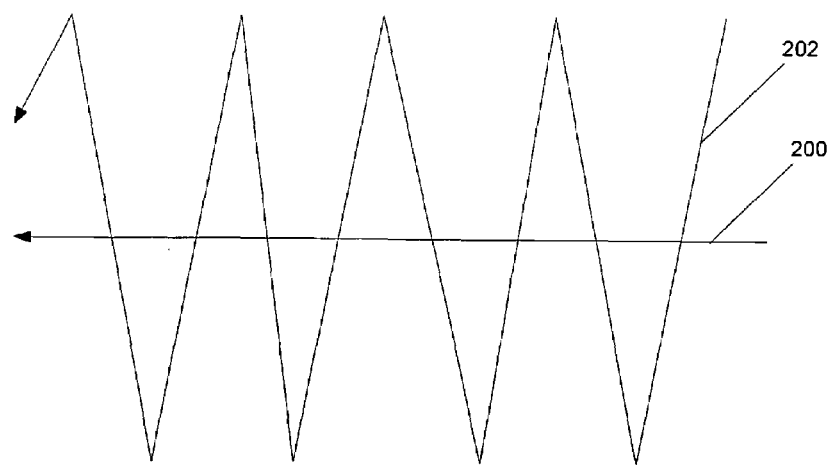
FIG. 2 depicts a scan pattern used by the present invention.

FIG. 2 depicts a flight path 200 that is flown by the aerial platform while the sensor suite 102 is performing a scan pattern 202 that zigzags about the flight path 200. As such, a swath of terrain is imaged from the air with each pass of the platform. By flying in a serpentine path, the aerial platform can image a large area of terrain.

Figure 3:
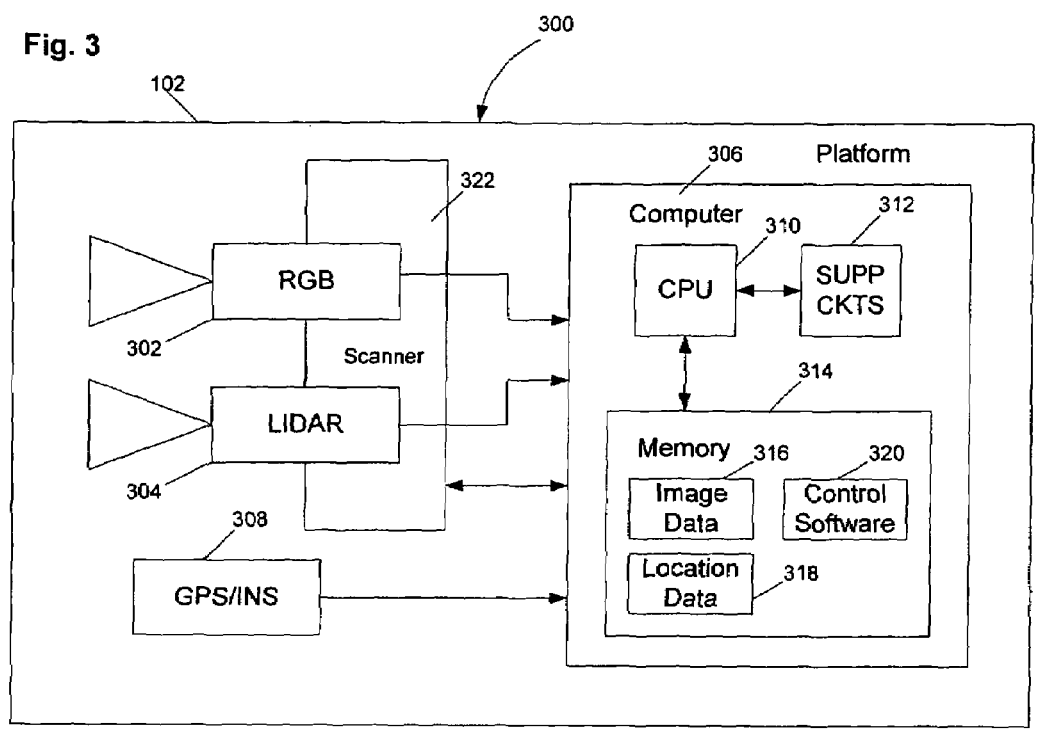
FIG. 3 depicts a block diagram of a sensor suite that is mounted to the aerial platform in accordance with the present invention.

FIG. 3 depicts a block diagram of a sensor suite 102 that is carried by the platform 100 of FIG. 1. The sensor suite 102 comprises a sensor assembly 300 coupled to a computer 306. The sensor assembly 300 comprises an electro-optic sensor (e.g., a video camera 302) and a LIDAR sensor 304 that are coupled to one another by a scanner 322. The camera 302 and sensor 304 are physically aligned to have a common bore sight. The video camera 302 is, in one embodiment of the invention, an RGB camera. However, other camera may be used such as an infrared camera. In one embodiment of the invention, the LIDAR sensor 304 is a flash LIDAR focal plane array. By mounting the LIDAR sensor 304 and video camera 302 upon the same scanning platform (scanner 322), the video camera 302 and the LIDAR sensor 304 image objects on the ground at the same time.

The output from sensor assembly 300 is coupled to the computer 306 for storing the information from the assembly 300. Also included on the platform 100 is a GPS/INS unit 308 for providing position and orientation information for each of the images captured by the sensor assembly 300. The computer 306 comprises a CPU 310, a support circuits 312 and memory 314. The CPU 310 may be any one of many commercially available processors or microcontrollers. The support circuits 312 include various well known circuitry for supporting the operation of the CPU 310. The support circuits 312 may include clock circuits, cache, power supplies, input/output interfaces, and the like. The memory 314 may include random access memory, read only memory, disk drive memory, removable storage, and the like. The memory 314 stores the image data 316 created by the sensor assembly as well as metadata 318 created by the GPS/INS unit 308 and the scanner, e.g., the metadata comprises platform location, heading, and scanner direction (scan angle). Control software 320 is also stored in memory for controlling the scanner 322. The image data 316 and metadata 318 is generally stored on a removable PCMCIA flash card that can be easily removed from the platform and inserted into a processing system on the ground. Alternatively, the image data 316 and metadata 318 can be transmitted to a ground station while the platform is airborne.

More specifically, the sensor suite 102 provides the mapping data capability. The LIDAR sensor 304 is capable of acquiring, for example, 128×128 intensity and range images with a resolution of 1 m per pixel at a capture rate of up to 20 Hz. The camera 302 captures, for example, 480×480 pixel frames at the same frame rate as the LIDAR sensor 304.

The entire sensor suite 102 occupies a small volume, approximately 1 cubic foot, for a payload weight of 26 kg. This is a significant improvement over the existing airborne scanning laser systems that can occupy a volume as large as 7.7 cubic feet with a payload weight of 76.6 kg for the laser system alone.

During a typical flight, the aircraft flies several long parallel passes over the area of interest, while a scanning mirror oscillates the sensor across track. This pattern is shown in FIG. 2. The resulting data follows a two-dimensional zigzagged topology. With this acquisition pattern, temporally successive frames overlap by around 30%, and frames in successive rows of the zigzagged topology overlap by around 50%. During a typical 1 hour flight plan, approximately 7 GB of data are collected.

Figure 7:
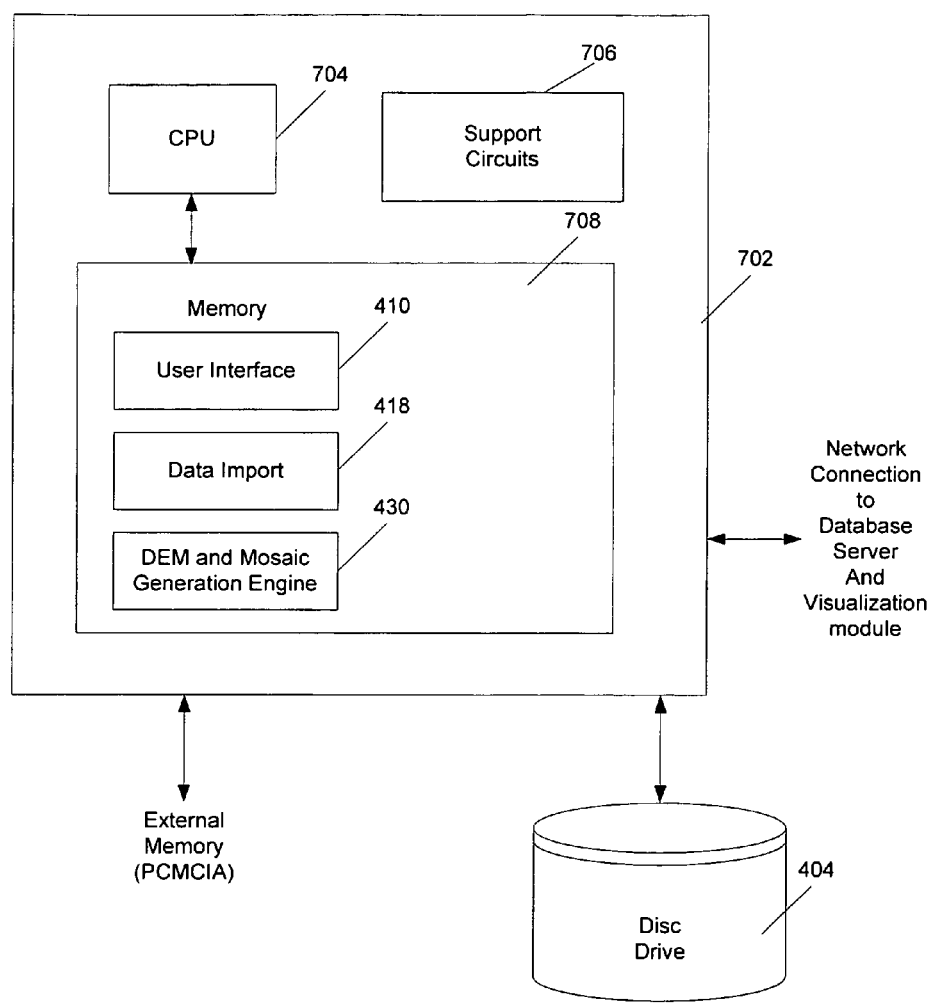
FIG. 7 depicts a block diagram of a computer system that is used to implement the invention.

FIG. 7 depicts a computer system 700 comprising a computer 702 and disk drive 704. The computer 702 comprises at least one central processing unit (CPU) 704, support circuits 706 and memory 708. In one embodiment of the invention, the computer 702 is a dual processor personal computer to achieve a processing rate equivalent to the data acquisition rate. In other words, the application will process one hour of data in the same amount of time that was required to collect the data. The CPU 704 may comprise one or more commercially available microprocessors or microcontrollers. The support circuits 706 are well-known support circuits that support the operation of the CPU 704. The support circuits 706 may include one or more of clock circuits, power supplies, cache, input/output circuits, network connection circuits and the like. The memory 708 comprises software to implement the present invention. The software applications include a user interface 410, a data import module 418 and a DEM and mosaic generation engine 430; each of which are discussed in detail below. The collected data, coupled to the computer 702 via a PCMCIA memory connection, is processed by the various software applications that generate a wide area digital elevation model (DEM) and orthorectified image mosaics from the collected data. The generated products (e.g., DEM or mosaics) are expressed with respective to UTM coordinates. The application software is backed by the relational database server "postgreSQL" in order to preserve information across work sessions. It also seamlessly links to a three-dimensional point cloud visualization module.

Typical workflow of a ground analyst to generate mapping products comprises the following steps: one, import the collected data from the memory card into the software; two, visualize the footprints of the LIDAR frames on a map and the 3-D point cloud in the three-dimensional viewer; three, optionally select region of interest for processing; four, register, adjust and grid the LIDAR frames to generate a DEM and an intensity orthorectified mosaic; five, orthorectify and mosaic the RGB visible data; six, view on a map and/or export the generated products.

Figure 4:
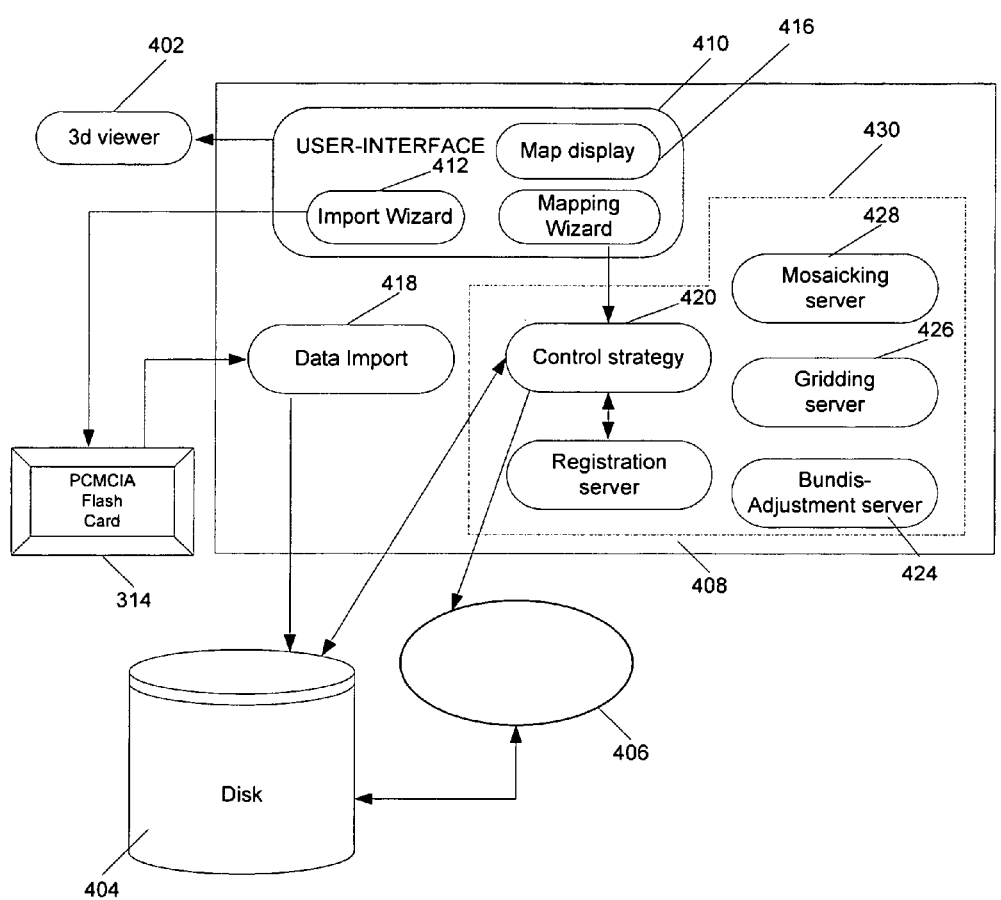
FIG. 4 depicts a functional block diagram of software used for processing the information collected by the sensor suite.

FIG. 4 depicts a functional block diagram of the application components involved as an operator progresses through the workflow while the application is executing on the CPU 432. First, data is imported from the memory flash card 314 into the application 408, through an intuitive wizard-based user interface 410. Then, after visualization on a map or in the three-dimensional viewer 402, the operator invokes the DEM generation and mosaicking engine 430, again through an intuitive wizard-based user interface 410. The engine 430 relies on a control strategy module 420 that orchestrates the data processing and dispatches data to the various data processing servers 428, 426, 424 and 422. As data is manipulated, whether through import or product generation, results are saved to disk 404 and the appropriate database entries are inserted in the database 406.

The data import module 418 converts the LIDAR range data collected during the flight session to LIDAR height field frames in a plane-plus-parallax form that will lead to an efficient frame registration framework. Essentially, the height field frames represent the relative heights of LIDAR point samples with respect to a reference plane located at the mean elevation in the frame. To be precise, the conversion step maps LIDAR frame points (u,v,r) where r is the LIDAR range to plane-plus-parallax points (u,v,p), p being the parallax computed for pixel (u,v) with respect to a reference plane. The benefit of this conversion is to map LIDAR range points to a projected space related to the chosen world coordinate system by a three-dimensional projective transformation (represented by a 4×4 matrix). Thus, two LIDAR height field frames will be related by a three-dimensional projective transformation. In fact, for frames within a row of the sensor scanning pattern, and affine transformation is sufficient to relate two frames. Such transformations can be estimated very efficiently using direct methods. Further detail on the registration process follows.

Although the final products are generated with respect to UTM coordinates, the data preprocessing expresses the input data with respect to a local vertical coordinate system (LVCS). The coordinates of the LVCS origin are that of the centroid of the collected data, rounded to the nearest multiple of 5,000 meters. The introduction of an LVCS serves two purposes: first, all the data processing is performed with respect to a Cartesian coordinate system; second, the local origin ensures that the numbers are kept small enough for accurate representation in a 32 bit float.

During import, successive LIDAR frames are grouped into segments, for efficient storage and access purposes. The segment's boundaries preserve flight line boundaries, so that segments will not straddle two flight lines. For a given segment, the following will be stored to disk: a sequence of height field frames, a sequence of intensity frames, a sequence of color visible frames and metadata records for each frame in the segment. Description information about the segments, including where to access the data sequences on disk and bounding rectangles, is saved in the database.

Figure 5:
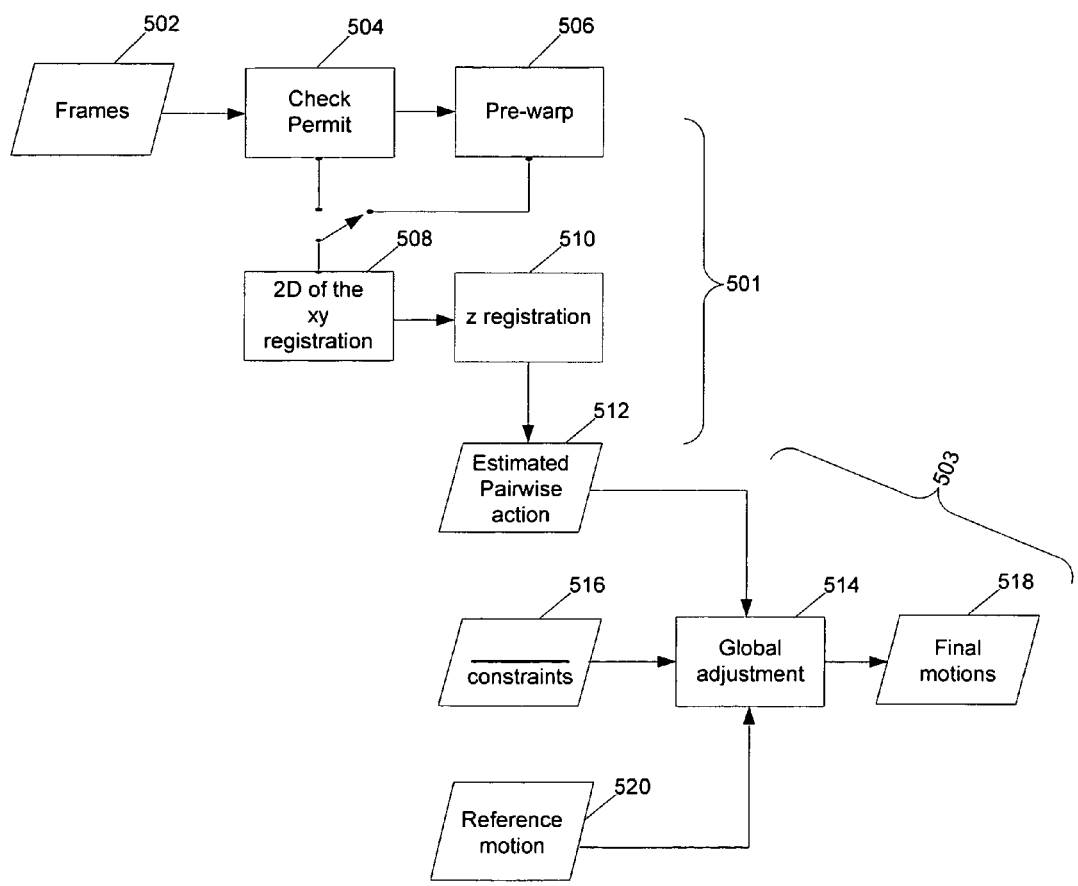
FIG. 5 depicts a flow diagram of the processing used by the present invention.

FIG. 5 is a flowchart depicting the registration process 500 as performed by the registration server 424 and the bundle adjustment server 424. Flash LIDAR registration consists of two major processes 501 and 503: first, in process 501, pairwise registration is performed on temporally adjacent frame pairs as well as other overlapping frame pairs that are selected by the topology inference process described below. Then, in process 503, all the pairwise registration motion parameters in a region are combined with metadata based constraints by least squares adjustment to achieve global consistency.

At step 502, frames are supplied to the method 500. The three-dimensional mapping between corresponding three-dimensional points in a pair of LIDAR height maps can be represented by a three-dimensional projective transformation. For frames taken from nearly the same aerial viewpoint, the effect of parallax on the mapping can be disregarded, allowing motion to be approximated by a two-dimensional affine transformation in the x-y plane composed with a translation and a shear in the z dimension. To check if parallax is negligible, at step 504, two test points are defined at the x,y center of one frame with minimum and maximum height values of that frame. The test points are mapped using the metadata to the other frame in the pair, and the x,y distance between the two warped points forms an upper bound on the amount of parallax between the two frames. If not negligible, then the original LIDAR height fields can be prewarped at step 506 using metadata into a common orthorectified (nadir view) coordinate system, upon which the previous approximations hold for the warped frames.

At steps 508 and 510, the two-dimensional affine transformation between two frames of height fields is estimated by a multiresolution direct alignment technique. A shifted and tilted plane model is fit by linear regression to the residual height between the affine registered frames. The final estimated three-dimensional mapping for this pair is then the composition of the x, y and z transforms (if prewarping was performed, the mapping is additionally composed with the prewarp transformations). At step 512, estimated pairwise motion information is output from the process 501.

At step 514, the terrain model is created one tile at a time using the estimated motion information 512, metadata constraints 516 and reference motion information 520. Given all the three dimensional mappings estimated for the selected frame pairs, the metadata for all the frames in a tile, and the placements of the adjoining frames in previously finished tiles, a least square adjustment is formed to estimate the optimum placement of each frame (three-dimensional rotation and translation) in the current tile. Each three-dimensional mapping is represented as a set of four virtual three-dimensional tie point correspondences. Due to noise, the constraints cannot all be exactly satisfied simultaneously, so the placement parameters are jointly estimated to minimize a robust total error criterion. The result of process 503 is final motion information 518.

Each constraint is inversely weighted by its uncertainty so that three-dimensional mappings with high expected noise to not adversely affect the global solution. The noise level of metadata is assumed to be constant over time and thus a fixed weight of one is assigned to all the constraints from metadata. A weight of infinity is assigned to constraints on the frames in previously finished tiles, since their placements can no longer be allowed to change. For estimated pair wise motions, a weight between 0 and 10 is defined by the sharpness of the correlation peak. Specifically the normalized correlation between two height fields registered by two-dimensional affine is computed and then also computed as the registration is perturbed by 4 pixels in 8 compass directions. The weight function favors high center correlation and penalizes high shifted correlations, which indicate uncertainty in the motion estimation. A weight of 0 indicates that the pairwise registration failed.

Given the sheer amount of data to be processed for a single flight, the invention uses an approach that generates DEMs and mosaics on a tile by tile basis. The size of all the tiles is the same, and user specified. The origins of the tiles are defined along a fixed partition of the UTM coordinate system, so that the tiles generated from different overlapping flights are consistent. Also, overlap exists between contiguous tiles, to maintain continuity across tiles, and so that the edge artifacts that occur during gridding and orthorectification can be trimmed off.

The control strategy module orchestrates the processing of data on a tile by tile basis. For each tile, the control strategy module finds the segments that fall into or overlaps with that tile and proceeds to pull together all the frames of those segments for processing. In order to generate the constraints for the bundle adjustment as described above, frames that overlap must be identified for registration. For a given frame, there will be several types of overlapping frames that are candidate for registration: temporally adjacent frames, and spatially adjacent frames. The second category will include frames that belong to the same flight line as the given frame, and frames that belong to a different flight line. This process of discovering the relative placement of frames, or framed topology, is referred to as a topology inference. While for a given frame, there may be several overlapping frames that fit for registration performing all possible registrations would counter the objective of the data processing rate equivalent to the data acquisition rate. As such, only a subset of registration will actually be performed based on inference modules selection.

Figure 6:
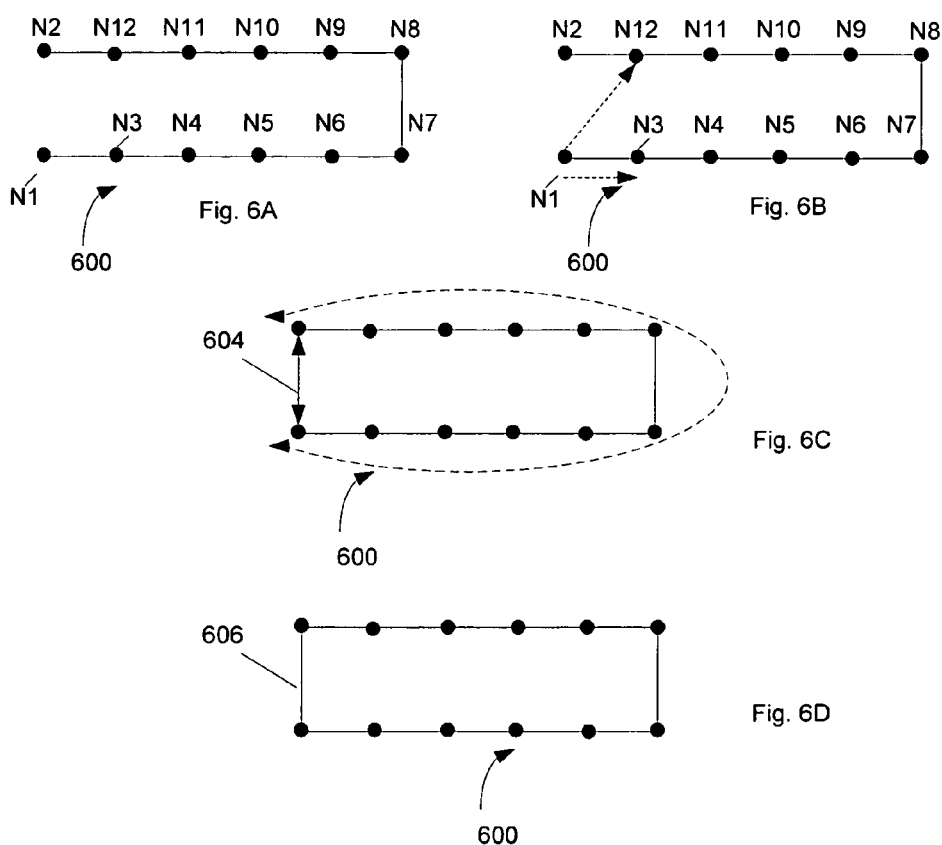
FIGS. 6A-6D depict a graphical representations of a process used to process image data in the present invention.

As depicted in FIGS. 6A-6D, the topology inference module (located within the control strategy module) operates by building an undirected weighted graph 600 for each tile, where each node (dot) is a frame relevant to that tile, and edges (lines) are weighted by the overlap between the two frames they link. The mapping from a frame to the LVCS as derived from the metadata is made available during the inference process. By cascading the initial mappings of two frames $F_1$ and $F_2$, the topology inference module computes the overlap between two frames as the distance between their centers expressed in the coordinate system of one of the frames. The graph 600 of FIG. 6A is first initialized with all the frames relevant to a tile. Edges are inserted between frames that are temporally adjacent, without duplication.

From this initial configuration, each node is visited and all frames overlapping with corresponding frames are identified, whether they are from the same flight line or not. Overlapping frames are visited (dashed arrowed lines of FIG. 6B) by descending order of overlap, to preferentially insert edges with the most overlapping frames first. To simplify, the subsequent explanation, $F_1$ is referred to as the frame represented by the currently visited node $N_1$, and $F_2$ as one of the frames overlapping $F_1$. The node representing $F_2$ is referred to node $N_2$. If $F_2$ is temporally adjacent to frame $F_1$, no edge is inserted since it already exists following initialization (e.g., nodes $N_1$ and $N_3$). However, if it isn't, as shown in FIG. 6C, an insertion cost is computed to determine whether an edge should be inserted. Intuitively, this cost weighs the shortest path 602 between node $N_1$ and node $N_2$ before insertion, against the shortest path 604, effectively the overlap between frame $F_1$ and frame $F_2$, that would result from the edge insertion. Practically, it is computed as the ratio of the Dijkstra shortest path between node $N_1$ and node $N_2$, to the overlap between frame $F_1$ and frame $F_2$. If the computed ratio exceeds a certain threshold, an edge 606 is inserted. This insertion strategy heuristically insures that edges are inserted sparsely along the graph 600. At FIG. 6D, the edge 606 has been inserted into the graph 600 and the process continues to the next node $N_3$. The process repeats until all the nodes (frames) are processed. Once the graph is complete, the list of frames to register and include in the bundle adjustment is given by the graph's edges. The control strategy module can then invoke the registration and bundle adjustment servers to perform the frame alignment.

Given that the database does not store geographic bounds for individual frames but whole segments, the frames pulled for a tile are inserted in a spatial index maintained in memory to speed up the identification of overlapping frames. The spatial index is maintained for the processing of an entire data collection.

After bundle adjustment, the LIDAR data is resampled using the regridding server 426 along a uniformed grid, a process also referred to as "gridding", to generate a DEM. The gridding approach performs a simple averaging: pixels from the LIDAR height field frames are warped to points in the UTM coordinate system, then each point is stored in the proper bin. If there are multiple points in a bin, they are added together and divided by the bin count. Optionally, an orthorectified mosaic can be generated from the intensity data the same time as the DEM. Once a DEM is available, the color visible frames can be orthorectified and mosaicked.

The mosaicking server 428 uses a backward warping strategy for mosaicking both the intensity and color frames. The process first computes the bounding box of a given height field frame in the UTM coordinate system. Each DEM pixel (x, y, z) in the bounding box is warped back to a pixel (u, v, p) in the height field frame. The process then compares the parallax value P, computed from warping, to the parallax value P' at position (u, v), interpolated from the height field frame: if P' differs significantly from P, then the DEM pixel is occluded from the view of the height field frame and should be skipped. Otherwise, the intensity or RGB value at position (u, v) is interpolated and inserted in the mosaic. For the color mosaic, the insertion position is related to the position (x, y, z) by an offset and scaling factor.

The invention is useful in rapidly creating a wide area terrain map using both LIDAR and visible sensor information.

While the foregoing is directed to embodiments of the present invention, other and further embodiments of the invention may be devised without departing from the basic scope thereof, and the scope thereof is determined by the claims that follow.

The invention claimed is:

1. A method of generating a wide area terrain map of a scene using a camera and a Light Detection and Ranging LIDAR sensor, comprising the steps of:
   accessing captured frames from the camera and frames from the LIDAR sensor;
   dividing the camera and LIDAR frames into a plurality of tiles;
   identifying overlapping frames for registration by building an undirected weighted graph for each tile, each node of the graph being a frame associated with a tile, wherein a list of frames to register is given by the edges of the graph;
   performing a pairwise registration on the overlapping frames;
   performing a bundle adjustment to estimate the optimum placement of each frame; and
   creating a digital elevation map (DEM) and three-dimensional mosaics of the scene using the registered frames.

2. The method and claim 1 further comprising:
   operating a sensor suite to simultaneously capture the camera and LIDAR frames; and
   storing the camera frames, LIDAR frames and metadata regarding the location and orientation of the sensor suite.

3. The method of claim 1, further comprising the steps of:
   importing the camera and LIDAR frames;
   visualizing a footprint of the LIDAR frames on a map; and
   adjusting and gridding the LIDAR frames to generate a DEM and an intensity orthorectified mosaic.

4. The method of claim 3 wherein importing step further comprises:
   using an intuitive wizard-based user interface.

5. The method of claim 3 wherein the importing step further comprises:
   converting the LIDAR frames into height field frames using a plane-plus-parallax form.

6. The method of claim 3 wherein the importing step further comprises:
   storing the height field frames with intensity frames, first images, and metadata for each frame and image.

7. The method of claim 6 wherein the metadata comprises: a location, heading and scan angle of the camera and sensor.

8. The method of claim 1, wherein the registering step comprises:
   pairwise registering at least one pair of one of temporally adjacent frames, spatially overlapped frames, and temporally adjacent frames and spatially overlapped frames to create pairwise motion parameters; and
   combining the pairwise motion parameters in a region with metadata to achieve global consistency of the registered frames.

9. Apparatus for generating a wide area terrain map of a scene comprising:
   a sensor suite comprising a camera and a Light Detection and Ranging (LIDAR) sensor coupled to a memory for storing frames and metadata containing location and orientation information regarding the sensor suite; and
   an image processing system comprising a digital elevation map (DEM) and mosaic generation engine, the image processing system being configured to:
   divide the camera and LIDAR frames into a plurality of tiles;
   identify overlapping frames for registration by building an undirected weighted graph for each tile, each node of the graph being a frame associated with a tile, wherein a list of frames to register is given by the edges of the graph;
   perform a pairwise registration on the overlapping frames;
   perform a bundle adjustment to estimate the optimum placement of each frame; and
   create a digital elevation map (DEM) and three-dimensional mosaics of the scene using the registered frames.

10. The apparatus of claim 9 wherein the image processing system comprises:
    a user interface; and
    a data import module coupled to the user interface.

11. The apparatus of claim 9 wherein the DEM and mosaic generation engine further comprises:

a control strategy module that is coupled to each of a registration server, a mosaicking server, a gridding server and a bundle adjustment server.

12. Apparatus for generating a wide area terrain map of a scene comprising a user interface;

a data import module, coupled to the user interface, for importing camera frames, Light Detection and Ranging (LIDAR) frames, and metadata from a memory device;

a digital elevation map (DEM) and mosaic generation engine, coupled to the user interface, for processing the camera frames, LIDAR frames and metadata to produce a mosaic of the camera frames, where the mosaic is a wide area terrain map, the digital elevation map (DEM) and mosaic generation engine being configured to:

divide the camera and LIDAR frames into a plurality of tiles;

identify overlapping frames for registration by building an undirected weighted graph for each tiles each node of the graph being a frame associated with a tile, wherein a list of frames to register is given by the edges of the graph;

perform a pairwise registration on the overlapping frames;

perform a bundle adjustment to estimate the optimum placement of each frame; and create the mosaic of the scene using the registered frames.

13. The apparatus of claim 12 wherein the DEM and mosaic generation engine comprises:

a controlled strategy module coupled to the user interface;

a registration service coupled to the control strategy module;

mosaicking server coupled to the control strategy module;

a gridding server coupled to the control strategy module; and a bundle adjustment server coupled to the control strategy module.

14. The method of claim 1, wherein the step of performing a pairwise registration further comprises the steps of, prewarping LIDAR height fields of a pair of frames using metadata into a common coordinate system if parallax is above a predetermined threshold; and aligning the pair of frames with a two dimensional affine transformation in the x-y plane followed by a translation and shear in the z-dimension.

15. The method of claim 14, wherein the step of determining whether parallax is above a predetermined threshold further comprises the steps of:

defining two test points at the x,y center of one frame with minimum and maximum height values of that frame; and mapping the test points using metadata to the other frame in the pair, the x,y, distance between the two points forming an upper bound on the predetermined threshold.

16. The method of claim 1, wherein the step of performing a bundle adjustment further comprises the step of producing placement parameters that are jointly estimated to minimize a total error criterion.

17. The method of claim 1, wherein the step of identifying overlapping frames for registration further comprises the steps of:

computing a cost (weight) to determine whether an edge is to be inserted between nodes of the graph;

determining if the computed ratio exceeds a predetermined threshold; and inserting an edge between the nodes if the threshold is exceeded.

18. The method of claim 1, wherein the step of performing a pairwise registration further includes the steps of:

estimating the two-dimensional affine transformation by a multiresolution direct alignment technique;

fitting a shifted and tilted plane model by linear regression to the residual height between the affine registered frames; and composing a final three dimensional mapping of the pair of frames using a composition of x, y, and z transforms.

19. The method of claim 1, wherein the step of creating three-dimensional mosaics comprises the steps of:

computing a bounding box of a height field frame in the UTM coordinate system;

warping each DEM pixel position in the bounding box back to a pixel position in the height field frame;

comparing a parallax value computed from warping to a second parallax value interpolated from the pixel position in the height field frame; and inserting an intensity or RGB value from the pixel position in the height field frame in the mosaic.

20. The method of claim 3, wherein the step of visualizing a footprint of the LIDAR frames on a map further includes the step of selecting an area of interest for processing.

21. The method of claim 3, further comprising the steps of:

orthorectifying and mosaicking the camera frames with respect to the DEM and intensity orthorectified mosaic; and viewing a mosaic of the camera frames.

* * * * *